US010661658B2

(12) United States Patent
Anma et al.

(10) Patent No.: US 10,661,658 B2
(45) Date of Patent: May 26, 2020

(54) MOBILE BODY USING REMOVABLE BATTERY

(71) Applicant: YAMAHA HATSUDOKI KABUSHIKI KAISHA, Iwata-shi, Shizuoka (JP)

(72) Inventors: Tomosada Anma, Shizuoka (JP); Shinji Tsuji, Shizuoka (JP); Masakazu Takano, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 60 days.

(21) Appl. No.: 15/964,158

(22) Filed: Apr. 27, 2018

(65) Prior Publication Data
US 2018/0244165 A1    Aug. 30, 2018

Related U.S. Application Data

(63) Continuation of application No. PCT/JP2016/063435, filed on Apr. 28, 2016.

(30) Foreign Application Priority Data

Nov. 2, 2015    (JP) .................. 2015-215901

(51) Int. Cl.
H02J 7/00        (2006.01)
B60L 11/18       (2006.01)
(Continued)

(52) U.S. Cl.
CPC ............ B60L 11/1816 (2013.01); B60L 3/00 (2013.01); B60L 3/0038 (2013.01); B60L 15/20 (2013.01);
(Continued)

(58) Field of Classification Search
CPC ..................................... B60L 3/0038
(Continued)

(56) References Cited

U.S. PATENT DOCUMENTS

2011/0050175 A1    3/2011  Odaohhara et al.
2013/0169261 A1*   7/2013  Fendt .................. G01R 31/041
                                              323/318
(Continued)

FOREIGN PATENT DOCUMENTS

EP    2 423 033 A2    2/2012
JP    08-171942 A     7/1996
(Continued)

OTHER PUBLICATIONS

Official Communication issued in International Patent Application No. PCT/JP2016/063435, dated Aug. 2, 2016.

Primary Examiner — Edward Tso
Assistant Examiner — Ahmed H Omar
(74) Attorney, Agent, or Firm — Keating and Bennett, LLP

(57) ABSTRACT

A vehicle includes an electric motor; a battery that is detachable from a body of the vehicle; a connector that electrically connects the battery with the vehicle body; and a temperature sensor that detects a temperature of the connector. In accordance with an electric power supplied from the battery via the connector, the electric motor generates a driving force to cause the vehicle to move. During movement of the vehicle and when the detected temperature is equal to or greater than a first threshold value, a controller performs control to lower power consumption of the vehicle compared to when the detected temperature is less than the first threshold value.

17 Claims, 14 Drawing Sheets

(51) Int. Cl.
- *B62M 7/12* (2006.01)
- *B60L 15/20* (2006.01)
- *H02H 5/04* (2006.01)
- *B60L 3/00* (2019.01)
- *B60L 53/80* (2019.01)
- *B60L 50/60* (2019.01)
- *B60L 50/51* (2019.01)
- *B60L 50/50* (2019.01)
- *B60L 50/64* (2019.01)
- *B60L 53/14* (2019.01)
- *H01M 10/44* (2006.01)

(52) U.S. Cl.
CPC ............... *B60L 50/50* (2019.02); *B60L 50/51* (2019.02); *B60L 50/64* (2019.02); *B60L 50/66* (2019.02); *B60L 53/14* (2019.02); *B60L 53/80* (2019.02); *B62M 7/12* (2013.01); *H01M 10/44* (2013.01); *H02H 5/04* (2013.01); *H02J 7/00* (2013.01); *H02J 7/0031* (2013.01); *B60L 2200/12* (2013.01); *B60L 2240/36* (2013.01); *Y02T 10/705* (2013.01); *Y02T 10/7005* (2013.01); *Y02T 10/7072* (2013.01); *Y02T 10/7258* (2013.01); *Y02T 90/124* (2013.01); *Y02T 90/14* (2013.01)

(58) Field of Classification Search
USPC .................................. 320/144, 150, 153, 154
See application file for complete search history.

(56) References Cited

U.S. PATENT DOCUMENTS

| | | |
|---|---|---|
| 2013/0181675 A1 | 7/2013 | Kawasaki et al. |
| 2013/0341109 A1* | 12/2013 | Ozaki .................. B60L 3/0061 180/65.51 |
| 2015/0127206 A1 | 5/2015 | Tsuji et al. |

FOREIGN PATENT DOCUMENTS

| | | | | |
|---|---|---|---|---|
| JP | 2004-279668 A | | 10/2004 | |
| JP | 2011-054342 A | | 3/2011 | |
| JP | 2011-139572 | * | 7/2011 | .............. B60L 11/18 |
| JP | 2011-139572 A | | 7/2011 | |
| WO | 2012/070432 A1 | | 5/2012 | |

* cited by examiner

MOBILE BODY USING REMOVABLE BATTERY

CROSS REFERENCE TO RELATED APPLICATIONS

This application claims the benefit of priority to Japanese Patent Application No. 2015-215901 filed on Nov. 2, 2015 and is a Continuation Application of PCT Application No. PCT/JP2016/063435 filed on Apr. 28, 2016. The entire contents of each application are hereby incorporated herein by reference.

BACKGROUND OF THE INVENTION

1. Field of the Invention

The present invention relates to a vehicle that generates a driving force by using electric power supplied from a detachable battery.

2. Description of the Related Art

A two-wheeled electric vehicle is a vehicle including a driving mechanism that is an electric motor. The electric motor rotates with the electric power supplied from a battery that is internal to the two-wheeled electric vehicle, for example, whereby the two-wheeled electric vehicle is able to travel.

International Publication No. WO 2012/070432 discloses a device which charges a battery that is internal to a two-wheeled electric vehicle. This battery that is internal to a two-wheeled electric vehicle is a battery of a type which is not detachable from the vehicle body, and thus charging is performed by connecting a connector of an external charger to a charging coupler which is provided on the vehicle body surface.

As compared to 12 V lead-acid batteries used for gasoline engine cars and the like, a battery that is internal to a two-wheeled electric vehicle, e.g., that disclosed in International Publication No. WO 2012/070432, repeatedly undergoes charging with a large current; therefore, the charging coupler that is used for charging the battery needs to be protected against heating. Since the charging coupler is often exposed to the external environment of the vehicle body, due to influences of the external environment or the like, foreign matter or the like may adhere to the charging coupler to increase its electrical resistance value, possibly generating heat. Therefore, in International Publication No. WO 2012/070432, a thermistor (temperature sensor) is disposed on the charging coupler to monitor the temperature, and control is performed so that the charging current is decreased when a predetermined temperature is exceeded. In the charging of the battery of a two-wheeled electric vehicle disclosed in International Publication No. WO 2012/070432, the amount of generated heat can be easily reduced by merely lowering the charging current.

On the other hand, one possible implementation of a two-wheeled electric vehicle is where the battery is detachable from the vehicle body, such that charging is performed while the battery is detached from the vehicle body, the battery being connected to the charger. When the two-wheeled electric vehicle travels, the battery is mounted to the vehicle body, so that electric power is supplied to the electric motor via a connecting portion which electrically connects the battery and the vehicle body. In such a two-wheeled electric vehicle, when the battery is detached from the vehicle body, the connecting portion becomes exposed to the external environment, possibly allowing foreign matter or the like to adhere thereto. During travel of the two-wheeled electric vehicle, a large current which is output from the battery flows through the connecting portion; therefore, when travelling with foreign matter adhering to the connecting portion, heat may be generated in the connecting portion.

SUMMARY OF THE INVENTION

Preferred embodiments of the present invention provide vehicles in which the temperature of a connector that electrically connects a battery and the body of the vehicle is monitored, and the power consumption during movement is lowered depending on the temperature.

A vehicle according to a preferred embodiment of the present invention includes an electric motor that generates a driving force to move the vehicle; a battery that is detachable from a body of the vehicle; a connector that electrically connects the battery with electric circuitry of the body when the battery is mounted to the body; a temperature sensor that detects a temperature of the connector; and a controller configured or programmed to, when the detected temperature is equal to or greater than a first threshold value, lower power consumption of the vehicle during movement as compared to when the detected temperature is less than the first threshold value; wherein, in accordance with an electric power supplied from the battery via the connector, the electric motor generates a driving force to cause the vehicle to move.

During movement of the vehicle, when the temperature of the connector which electrically connects the battery and the body of the vehicle becomes equal to or greater than a threshold value, power consumption of the vehicle is lowered. As a result, heating of the connector during movement of the vehicle is significantly reduced or prevented.

In a preferred embodiment of the present invention, the connector includes a current terminal in which an electric current through which output from the battery flows; an insulator is disposed between the current terminal and the temperature sensor; and the temperature sensor detects a temperature of the current terminal via the insulator. By controlling power consumption in accordance with the temperature of the current terminal, which is a source of heat, heating of the connector during movement of the vehicle is significantly reduced or prevented.

In a preferred embodiment of the present invention, the insulator insulates high-voltage circuitry from low-voltage circuitry in one of the battery and the body; the current terminal is disposed in the high-voltage circuitry; and the temperature sensor is disposed in the low-voltage circuitry. As a result, without providing an isolation circuit, the temperature of the current terminal provided on the high-voltage circuitry side is detected by using the temperature sensor provided on the low-voltage circuitry side.

In a preferred embodiment of the present invention, the connector includes a battery connector on the battery and a body connector on the body; and the temperature sensor is disposed on the battery connector. As a result, the temperature of the connector is able to be detected, and by controlling power consumption in accordance with the temperature of the connector, heating of the connector during movement of the vehicle is significantly reduced or prevented.

In a preferred embodiment of the present invention, the controller includes a battery management system in the battery, and is configured or programmed to lower the power consumption of the vehicle during movement by reducing the output of the battery. As the battery management system lowers the battery output in accordance with the temperature of the connector, heating of the connector during movement of the vehicle is significantly reduced or prevented.

In a preferred embodiment of the present invention, the temperature sensor further detects a temperature of the connector during charging of the battery; and during charging of the battery, the controller is configured or programmed to, when the detected temperature is equal to or greater than a predetermined value, lower a charging current as compared to when the detected temperature is less than the predetermined value. During charging of the battery, by controlling the charging current in accordance with the temperature of the connector, heating of the connector when receiving electric power is significantly reduced or prevented.

In a preferred embodiment of the present invention, the connector includes a battery connector on the battery a body connector on the body; and the temperature sensor is disposed on the body connector. As a result, the temperature of the connector is able to be detected, and by controlling the power consumption in accordance with the temperature of the connector, heating of the connector during movement of the vehicle is significantly reduced or prevented.

In a preferred embodiment of the present invention, the controller is configured or programmed to lower the power consumption of the vehicle during movement by reducing at least one of an output of the battery and a torque of the electric motor. By reducing at least one of the output of the battery and the torque of the electric motor in accordance with the temperature of the connector, heating of the connector during movement of the vehicle is significantly reduced or prevented.

In a preferred embodiment of the present invention, during lowering of the power consumption of the vehicle during movement, the controller is configured or programmed to gradually decrease at least one of an output of the battery and a torque of the electric motor. Even when the connector is heated to a predetermined level or above, the vehicle is gradually decelerated, such that sudden braking of the vehicle is prevented.

In a preferred embodiment of the present invention, after gradually decreasing at least one of the output of the battery and the torque of the electric motor, the controller is configured or programmed to set a number of revolutions of the electric motor to zero. Even when the connector is heated to a predetermined level or above, the vehicle is gradually decelerated to come to a stop, such that sudden braking of the vehicle is prevented.

In a preferred embodiment of the present invention, a notifier is provided to inform a rider of the vehicle that the power consumption of the vehicle during movement is being lowered. As a result, the rider is able to know that the power consumption is being lowered.

In a preferred embodiment of the present invention, when the detected temperature is equal to or greater than a second threshold value which is higher than the first threshold value, the controller is configured or programmed to stop the supply of electric power from the battery to the electric motor. As a result, heating of the connector during movement of the vehicle is significantly reduced or prevented.

In a preferred embodiment of the present invention, the controller is configured or programmed to store temperature information indicating that the detected temperature has become equal to or greater than the first threshold value. By storing temperature information, it becomes possible to utilize the temperature information to control the vehicle or for maintenance work.

In a preferred embodiment of the present invention, when restarting the vehicle, the controller is configured or programmed to control the power consumption of the vehicle based on the stored temperature information. By controlling the vehicle based on the temperature information, it becomes possible to perform a control which is in accordance with the state of the vehicle.

In a preferred embodiment of the present invention, the vehicle is a wheeled electric vehicle; and during travel of the wheeled electric vehicle, the controller is configured or programmed to, when the detected temperature is equal to or greater than the first threshold value, lower the power consumption of the wheeled electric vehicle as compared to when the detected temperature is less than the first threshold value.

During travel of the wheeled vehicle, when the temperature of the connector becomes equal to or greater than a threshold value, power consumption of the wheeled electric vehicle is lowered. As a result, heating of the connector during travel of the wheeled vehicle is significantly reduced or prevented.

According to a preferred embodiment of the present invention, during movement of the vehicle, power consumption of the vehicle is lowered when the temperature of a connector between the body of the vehicle and a battery becomes equal to or greater than a threshold value. As a result, heating of the connector during movement of the vehicle is significantly reduced or prevented.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
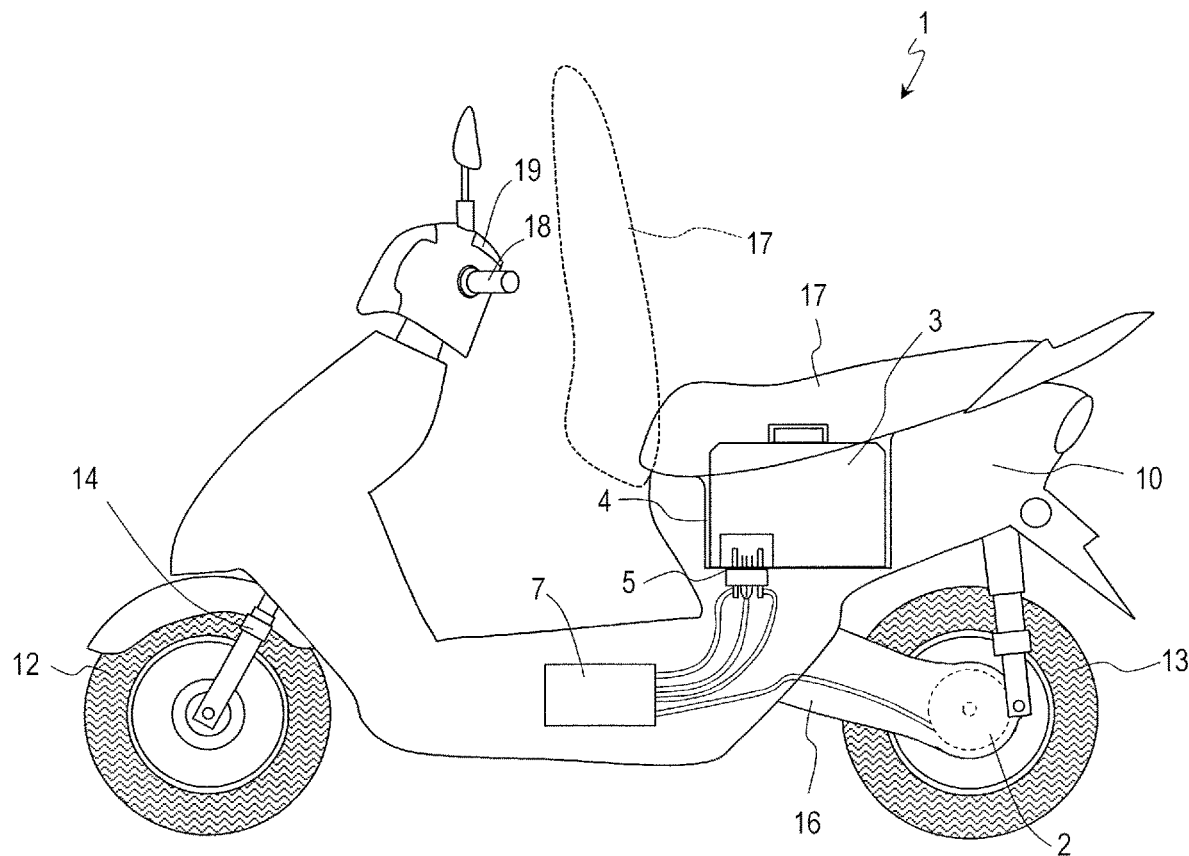
FIG. 1 is a side view showing a two-wheeled electric vehicle according to a preferred embodiment of the present invention.
Figure 1:
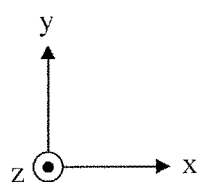

Hereinafter, with reference to the drawings, preferred embodiments of the present invention will be described. Like component elements are denoted by like reference numerals, and description of any overlapping component elements will be omitted. Note that the present invention is not limited to the following preferred embodiments.

FIG. 1 is a side view showing a straddled electric vehicle as an example of a vehicle according to a preferred embodiment of the present invention. In the example shown in FIG. 1, the straddled electric vehicle is a two-wheeled electric vehicle 1 of a scooter type, for example. Note that the straddled electric vehicle is not limited to a scooter-type two-wheeled electric vehicle illustrated herein. The straddled electric vehicles according to preferred embodiments of the present invention may be any other type of two-wheeled electric vehicle, e.g., a so-called on-road type, off-road type, or moped type. Straddled electric vehicles according to preferred embodiments of the present invention may be any arbitrary vehicle which a rider sits astraddle, without being limited to two-wheeled vehicles. A straddled electric vehicle according to a preferred embodiment of the present invention may be a three-wheeled vehicle (LMW) or the like of a type whose direction of travel is changed as the vehicle body is tilted, or any other straddled electric vehicle such as an ATV (All Terrain Vehicle).

In the following description and the drawings, the front, rear, right, and left are respectively meant as the front, rear, right, and left as perceived by the rider of the two-wheeled electric vehicle 1. The x direction shown in the figures corresponds to the front-rear direction of the two-wheeled electric vehicle 1; the y direction corresponds to the up-down direction; and the z direction corresponds to the right-left direction.

As shown in FIG. 1, the two-wheeled electric vehicle 1 includes a vehicle main body 10, steering handle bars 18, a front wheel 12, a rear wheel 13, and an electric motor 2. For ease of explanation, FIG. 1 shows portions of the interior of the two-wheeled electric vehicle 1 in a see-through view.

The vehicle main body 10 has a structure including a body frame and a body cover. The vehicle main body 10 supports front forks 14. The steering handle bars 18 are attached above the front forks 14. The front wheel 12 is supported at the lower end of the front forks 14. Near the steering handle bars 18, a display 19 is provided which displays various information such as velocity of travel, remaining battery power, operating modes, etc.

The rear wheel 13 and the electric motor 2 are swingingly supported by the vehicle main body 10 via a swing arm 16. In this example, the rear wheel 13 is the drive wheel, whereas the front wheel 12 is a driven wheel. The two-wheeled electric vehicle 1 travels as the rotation of the electric motor 2 is transmitted to the rear wheel 13.

The two-wheeled electric vehicle 1 further includes a battery 3 which supplies electric power to the electric motor 2, and an MCU (Motor Control Unit) 7 which controls the operation of the electric motor 2.

The vehicle main body 10 supports a seat 17 on which the rider sits. Below the seat 17 of the vehicle main body 10 is provided a battery case 4, in which the battery 3 is accommodated. The battery case 4 is box-shaped or substantially box-shaped with an open upper surface, such that the seat 17 covers over the upper surface of the battery case 4.

The battery 3 is detachable from the vehicle main body 10. When detached from the vehicle main body 10, the battery 3 is connected to an external charger (not shown) for charging. As indicated by a dotted line in FIG. 1, the seat 17 is of a type that opens and closes. As the rider opens the seat 17 and lifts the battery 3 up while holding it with one hand, the rider is able to remove the battery 3 to outside the vehicle main body 10.

When the two-wheeled electric vehicle 1 is to travel, the battery 3 is mounted to the battery case 4. The connector 5 electrically connects the battery 3 and electric circuitry of the vehicle main body 10. Electric power which is output from the battery 3 is supplied to the electric motor 2 via the connector 5 and the MCU 7. Note that the number of batteries 3 is not limited to one; two or more batteries 3 may be accommodated in the battery case 4.

Figure 2:
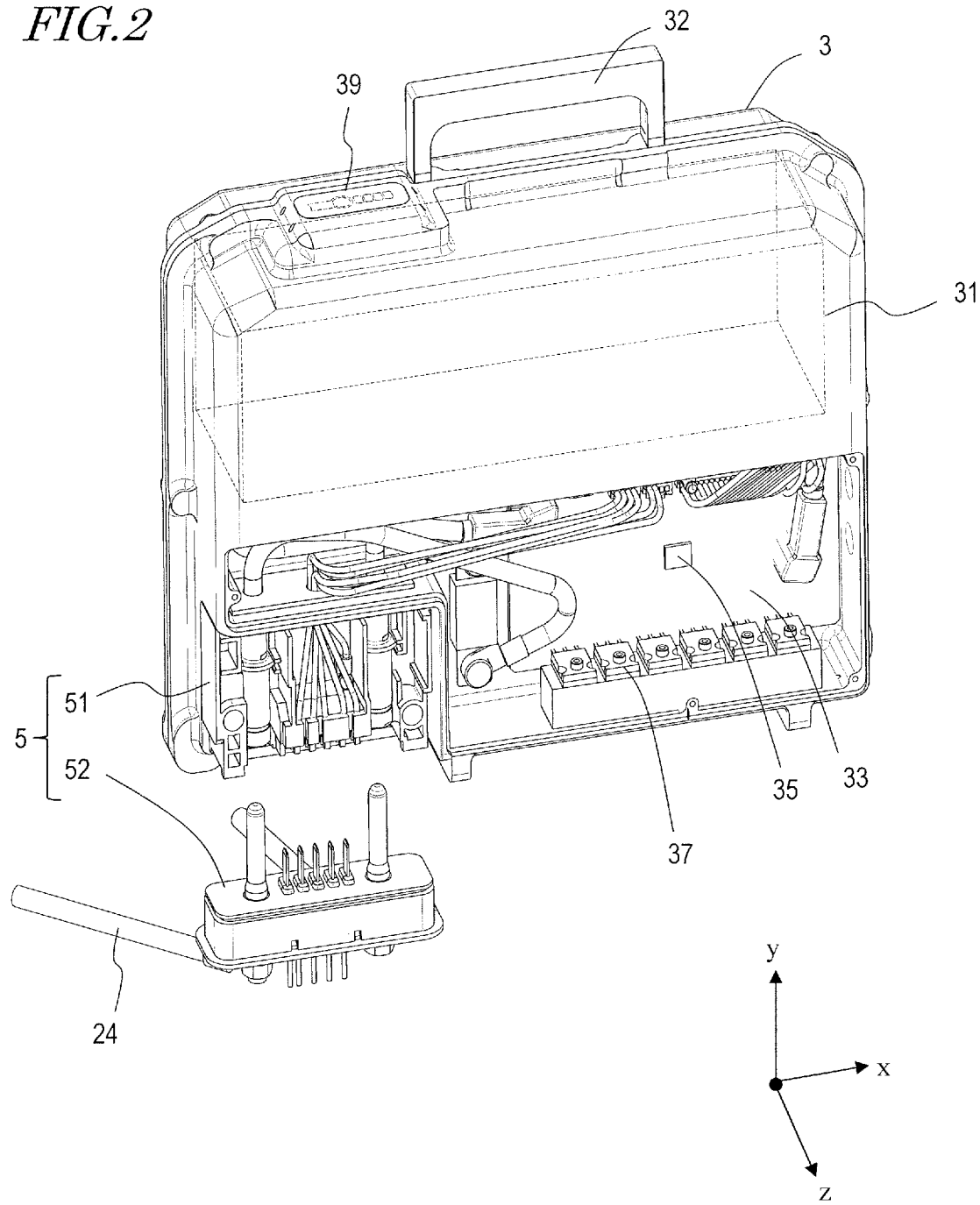
FIG. 2 is a perspective view showing a battery and a connector according to a preferred embodiment of the present invention.

FIG. 2 is a perspective view showing the battery 3 and the connector 5. For ease of explanation, the interior of the battery 3 is shown in a see-through view. The connector 5 includes a connector 51 which is provided on the battery 3 and a connector 52 which is provided on the vehicle main body 10. When the battery 3 is mounted to the battery case 4, the connector 51 and the connector 52 become electrically connected.

The battery 3 includes a battery module 31, a grip 32, a battery management system (BMS) 33, and a display 39. The battery module 31 includes a plurality of cells. The BMS 33 includes a microcomputer 35 and switches 37. The microcomputer 35 controls various operations of the battery 3. The switches 37 allow electric currents to be switched ON or OFF in various operations. The display 39 indicates the state of the battery 3. The display 39 may display, for example, the remaining power of the battery, whether the battery state is normal or abnormal, and so on.

The battery 3 is able to be slidably inserted into or detached from the battery case 4 (FIG. 1). As the rider opens the seat 17, holds the grip 32 of the battery 3 with one hand, and slides the battery 3 upward, the rider is able to detach the battery 3 from the vehicle main body 10. When mounting the battery 3 to the vehicle main body 10, the battery 3 is inserted into the battery case 4 and slid downward, such that the battery 3 becomes mounted. Upon this slide-mounting, the connector 51 on the battery 3 and the connector 52 on the vehicle main body 10 become electrically connected.

Figure 3:
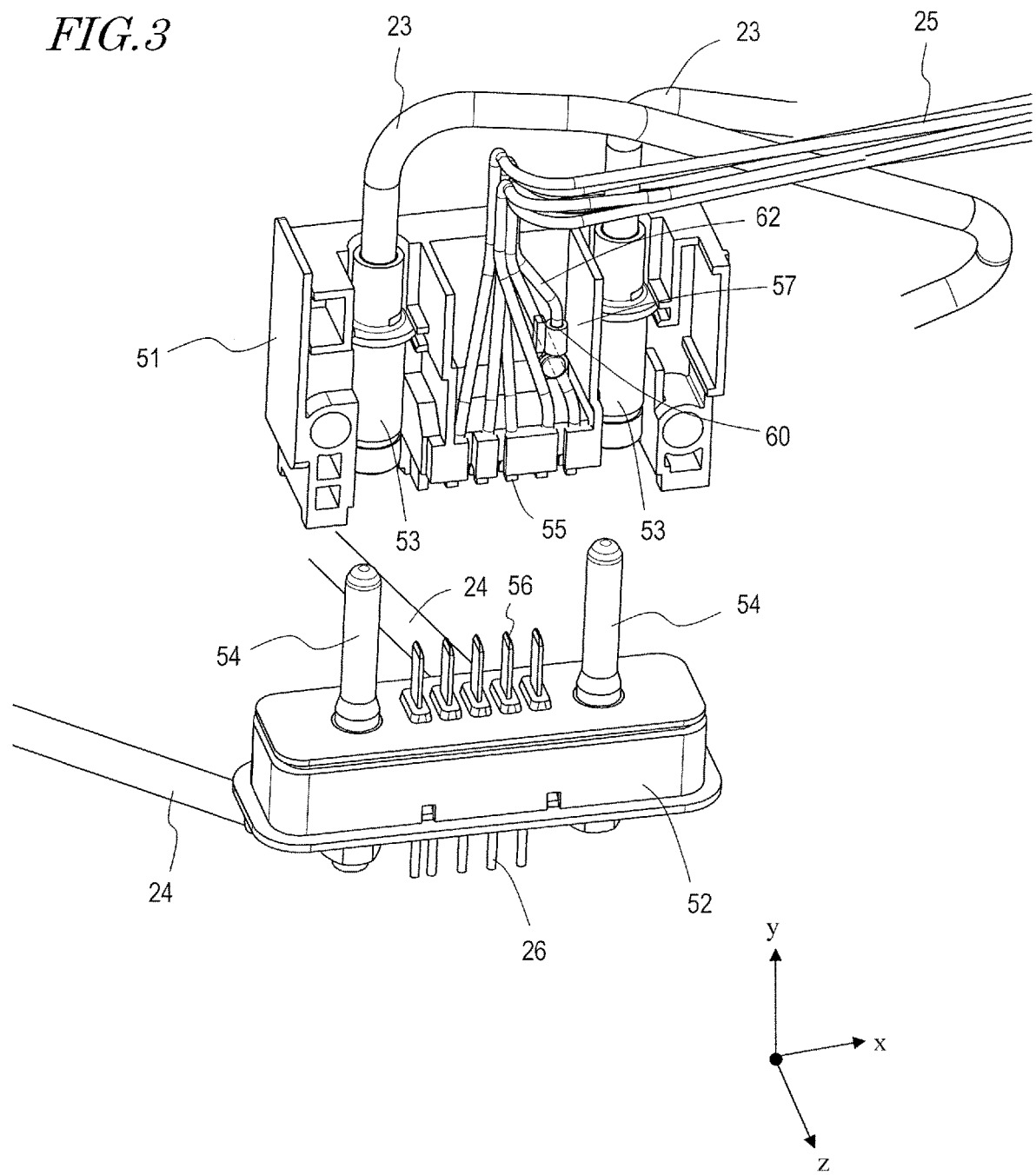
FIG. 3 is a perspective view showing a connector on a battery and a connector on the vehicle main body according to a preferred embodiment of the present invention.

FIG. 3 is a perspective view showing the connector 51 on the battery 3 and the connector 52 on the vehicle main body 10. The connector 51 includes current terminals 53, signal terminals 55, and an electrical insulator 57. Electric wires 23 are connected to the current terminals 53, whereas signal lines 25 are connected to the signal terminals 55. The connector 52 includes current terminals 54 and signal terminals 56. Electric wires 24 are connected to the current terminals 54, whereas signal lines 26 are connected to the signal terminals 56.

The current terminals 53 and 54 extend in the direction of sliding when attaching or detaching the battery 3 so that, when the battery 3 is inserted in the battery case 4 and slid downward, the current terminals 54 are inserted in the current terminals 53, such that the two become electrically connected to each other. The large current which is output from the battery module 31 flows to the current terminals 53 via the electric wires 23. This large current is input from the current terminals 53 to the MCU 7 via the current terminals 54 and the electric wires 24, and used to drive the electric motor 2.

When the connector 51 and the connector 52 are connected, the signal terminals 55 and the signal terminals 56 become electrically connected. Exchange of control signals between the battery 3 and the vehicle main body 10 is performed via the signal lines 25 and 26 and the signal terminals 55 and 56.

The current terminals 53 and the electric wires 23, to which high voltages are applied, are component elements of the high-voltage circuitry that is included in the battery 3. As used herein, a high voltage is a voltage of, e.g., about 60 V or above. For example, in an implementation where two batteries having an output voltage of about 60 V, for example, are connected in series, the voltage across opposite ends will be about 120 V. On the other hand, the signal terminals 55 and signal lines 25, to which low voltages are applied, are component elements of the low-voltage circuitry that is included in the battery 3. As used herein, a low voltage is a voltage of, e.g., about 1.0 to about 12 V. Similarly, the current terminals 54 and the electric wires 24, to which high voltages are applied, are component elements of the high-voltage circuitry that is included in the vehicle main body 10. The signal terminals 56 and the signal lines 26, to which low voltages are applied, are component elements of the low-voltage circuitry that is included in the vehicle main body 10.

In the two-wheeled electric vehicle 1 of the present preferred embodiment, the battery 3 is detachable from the vehicle main body 10, and, while the battery 3 is detached from the vehicle main body 10, the battery 3 is connected to an external charger (not shown) for charging. When the battery 3 is thus detached from the vehicle main body 10, the current terminals 53 and 54 are exposed to the external environment, and therefore foreign matter or the like may adhere to at least one of them. During travel of the two-wheeled electric vehicle 1, a large current will flow in the current terminals 53 and 54, and therefore heat may be generated if foreign matter or the like is present on the current terminals 53 and/or 54. Therefore, in the two-wheeled electric vehicle 1 of the present preferred embodiment, the temperature of the current terminals 53 and 54 is detected, and power consumption of the two-wheeled electric vehicle 1 during movement is controlled in accordance with this temperature.

In the example of FIG. 3, the temperature sensor 60 which is used to detect the temperature of the current terminals 53 and 54 is provided on the connector 51 on the battery 3. In this example, the temperature sensor 60 is provided on the low-voltage circuitry side, and the insulator 57 is disposed between the current terminals 53 of the high-voltage circuitry side and the temperature sensor 60. The temperature sensor 60 and the current terminals 53 are electrically insulated by the insulator 57. In the present preferred embodiment, indirectly measuring the temperature of the current terminals 53 via the insulator 57 ensures the separation of electric circuitry between the high-voltage circuitry and the low-voltage circuitry, thus realizing a structure which does not need an isolation circuit.

As the material of the current terminals 53 and 54, a highly electrically conductive material, e.g., oxygen-free copper, is preferably used. Since a highly electrically conductive material also has a high thermal conductivity, the temperature difference between the current terminals 53 and the current terminals 54 is very small. Therefore, in practice, measuring the temperature of the current terminals 53 would be equivalent to measuring the temperature of the current terminals 54.

As the temperature sensor 60, any arbitrary temperature sensor may be used, e.g., a thermistor or a thermocouple. In this example, a thermistor whose electrical resistance value changes with changing temperature may be used as the temperature sensor 60. The temperature sensor 60 is connected to the BMS 33 via signal lines 62, such that the BMS 33 is able to detect temperature from an electrical resistance value of the temperature sensor 60.

Figure 4:
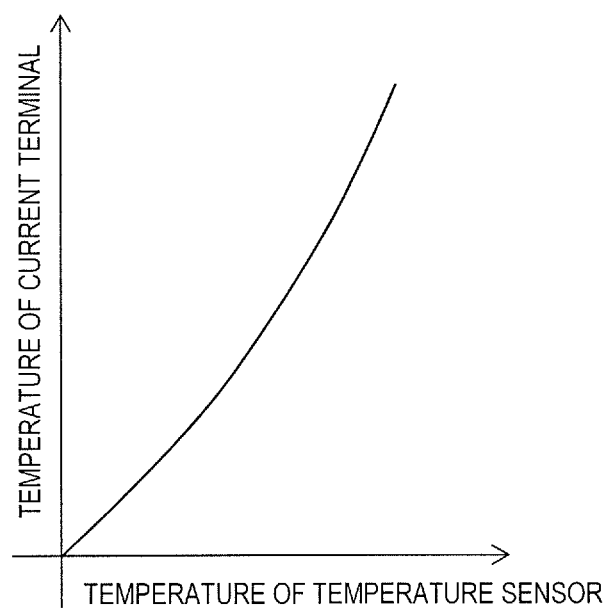
FIG. 4 is a diagram showing a relationship between the temperature of current terminals and the temperature which is detected by a temperature sensor according to a preferred embodiment of the present invention.

The temperature sensor 60 is disposed near the current terminals 53, but because of the presence of the insulator 57 between them, the temperature which is detected by the temperature sensor 60 is slightly lower than the actual temperature of the current terminals 53. FIG. 4 is a graph showing an exemplary relationship between the temperature of the current terminals 53 and the temperature which is detected by the temperature sensor 60. The vertical axis represents the temperature of the current terminals 53, and the horizontal axis represents the temperature which is detected by the temperature sensor 60. The relationship in temperature between the current terminals 53 and the temperature sensor 60 may be obtained in advance through measurement. For example, the BMS 33 may store in advance such a relationship of temperature between the current terminals 53 and the temperature sensor 60, and based on this relationship and a measurement value of the temperature sensor 60, the temperature of the current terminals 53 is known.

During travel of the two-wheeled electric vehicle 1, if the detected temperature is equal to or greater than a threshold value, the BMS 33 reduces the output of the battery 3 as compared to when the detected temperature is less than the threshold value, thus lowering the power consumption during travel. As a result of this, heating of the connectors 51 and 52 during travel of the two-wheeled electric vehicle 1 is significantly reduced or prevented.

Note that the temperature to be compared against the threshold value may be a measurement value of the temperature sensor 60, or a temperature of the current terminals 53 as calculated on the basis of the aforementioned relationship. In the case where a measurement value of the temperature sensor 60 is used, the threshold value may be about 80 degrees Celsius, for example. In the case where a calculated temperature of the current terminals 53 is used, the threshold value may be about 90 degrees Celsius, for example.

Figure 5:
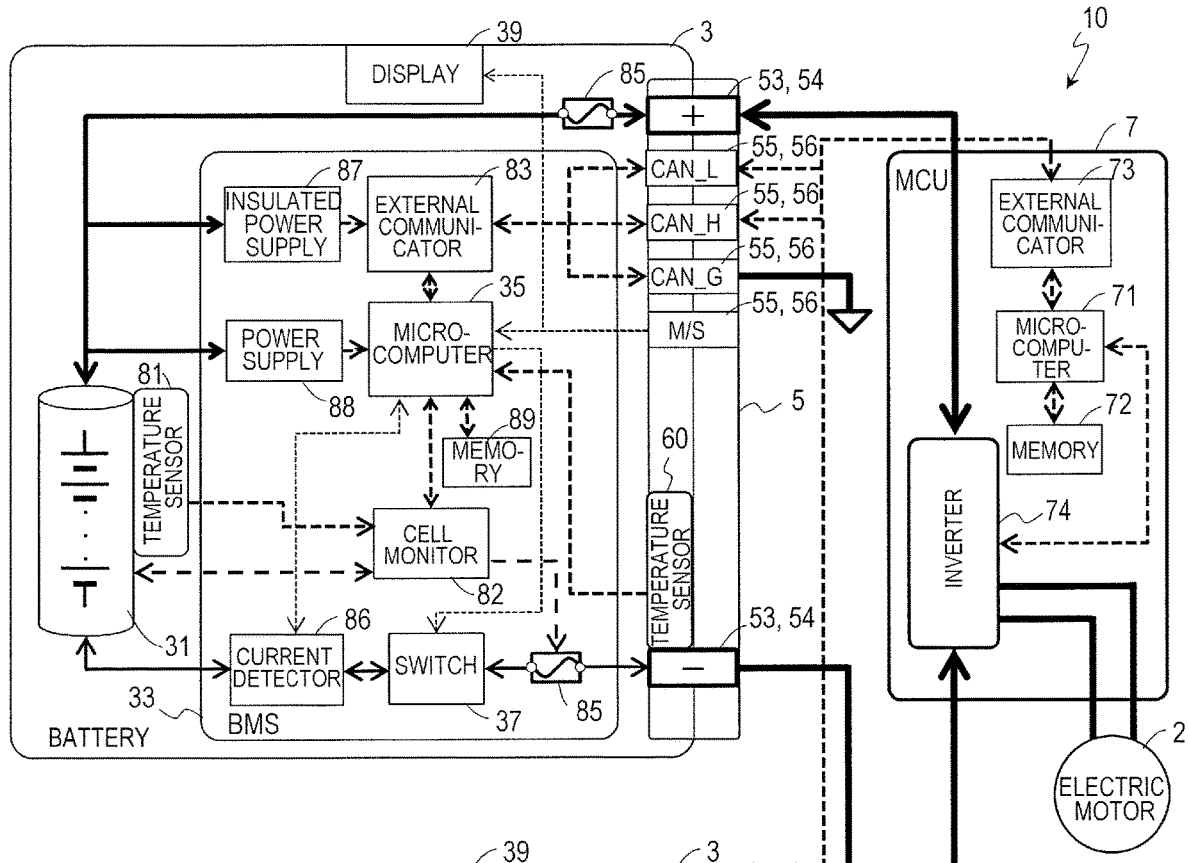
FIG. 5 is a diagram showing a vehicle main body with batteries mounted thereon according to a preferred embodiment of the present invention.

FIG. 5 is a diagram showing the vehicle main body 10 with the batteries 3 mounted thereon. In the example of FIG. 5, two batteries 3 are mounted on the vehicle main body 10, the two batteries 3 being connected in series. Given that one battery 3 has an output voltage of about 60 V, for example, the voltage across opposing current terminals 53 and 54 will be about 120 V, for example. The electric current value is about 120 amperes at the maximum, for example.

The BMS 33 of each battery 3 includes a microcomputer 35, switches 37, a cell monitor 82, an external communicator 83, an insulated power supply 87, a power supply 88, and a memory 89. The MCU 7 which is provided on the vehicle main body 10 includes a microcomputer 71, a memory 72, an external communicator 73, and an inverter 74.

In this example, the battery module 31 has an output voltage of about 60 V. The power supply 88 supplies electric power to the microcomputer 35, whereas the insulated power supply 87 supplies electric power to the external communicator 83. The cell monitor 82 monitors the state of the battery module 31. The battery module 31 includes a temperature sensor 81 disposed thereon to measure its temperature, and the cell monitor 82 monitors the temperature of the battery module 31 by using the temperature sensor 81. Moreover, the cell monitor 82 monitors the voltage of the battery module 31. The microcomputer 35 monitors the electric current value by using a current detector 86. The switches 37 allow electric currents to be switched ON or OFF in various operations. The battery 3 includes a fuse 85 provided thereon, so that the fuse 85 cuts the electric current in cases of abnormality, e.g., when a large current flows that is greater than rated.

The external communicator 83 of the BMS 33 and the external communicator 73 of the MCU 7 exchange various control signals via the connector 5. The exchange is made by using a CAN (Controller Area Network), for example. The memories 72 and 89 are storage media that store computer programs which define the procedures of various processes to be executed by the microcomputers 71 and 35. Based on the computer programs which are read from the memories 72 and 89, the microcomputers 71 and 35 execute the various processes.

The DC power which is output from the batteries 3 is input to the inverter 74 via the connector 5. The inverter 74 outputs to the electric motor 2 an AC power which is in accordance with the control by the microcomputer 71, such that the electric motor 2 rotates to generate a driving force. Note that the inverter 74 may be provided separately from the MCU 7. Although the electric motor 2 and the MCU 7 preferably are separately provided in this example, a motor assembly or system that includes the electric motor 2 and the MCU 7 may instead be provided.

Figure 6:
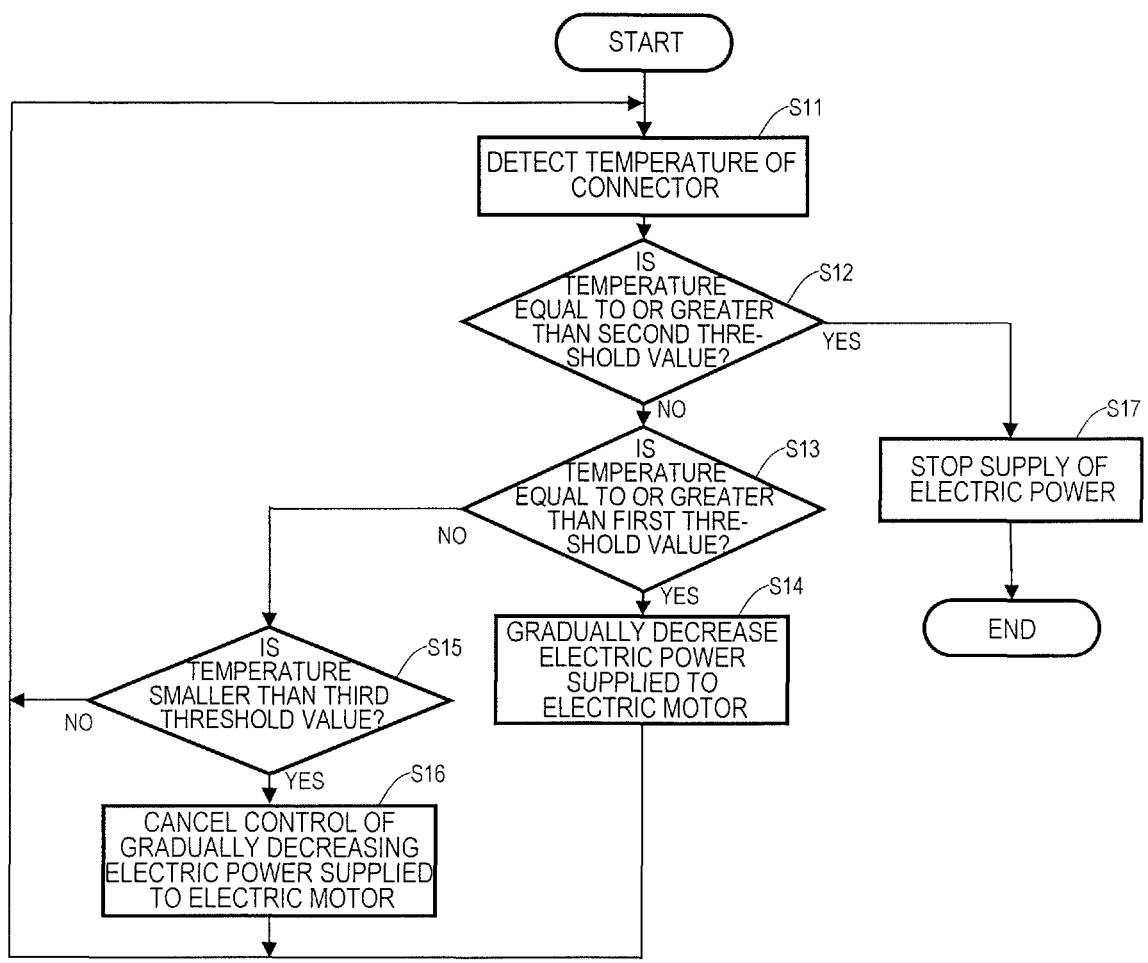
FIG. 6 is a flowchart showing a process of adjusting an electric power supplied to an electric motor in accordance with the temperature of a connector according to a preferred embodiment of the present invention.

FIG. 6 is a flowchart showing an exemplary process of adjusting an electric power supplied to the electric motor 2 in accordance with the temperature of the connector 5.

During travel of the two-wheeled electric vehicle 1, the BMS 33 of the battery 3 monitors the measurement value of the temperature sensor 60 on the connector 51 (step S11). The BMS 33 determines whether or not the measurement value of the temperature sensor 60 is equal to or greater than a second threshold value (step S12). The second threshold value, e.g., about 100 degrees Celsius, is a temperature that is higher than a first threshold value which will be described below.

If the measurement value of the temperature sensor 60 is equal to or greater than the second threshold value, the BMS 33 stops the supply of electric power, thus preventing an electric current from flowing in the current terminals 53 and 54 (step S17). As a result of this, the two-wheeled electric vehicle 1 decelerates and stops. Since this stopping is based on the abnormality that the measurement value of the temperature sensor 60 is equal to or greater than the second threshold value, the microcomputer 71 maintains this control of preventing travel of the two-wheeled electric vehicle 1 until the rider powers OFF the two-wheeled electric vehicle 1.

At step S12, if the measurement value of the temperature sensor 60 is less than the second threshold value, the BMS 33 determines whether or not the measurement value of the temperature sensor 60 is equal to or greater than a first threshold value (step S13). The first threshold value may be about 80 degrees Celsius, for example. At step S13, if the measurement value of the temperature sensor 60 is equal to or greater than the first threshold value, the electric power supplied to the electric motor 2 is gradually decreased (step S14). For example, the microcomputer 35 may communicate with the microcomputer 71 to lower the output power of the inverter 74, thus gradually lowering the electric power supplied to the electric motor 2. For example, by PWM (Pulse Width Modulation) control, the electric power supplied to the electric motor 2 may be gradually lowered. Controlling the inverter 74 to lower the power consumption of the electric motor 2 consequently lowers the output power of the battery 3. As a result of this, the electric power flowing in the current terminals 53 and 54 is lowered, such that heating of the connector 5 is significantly reduced or prevented. Moreover, power consumption of various devices, e.g., electrical accessories, may also be lowered. Thus, by lowering the power consumption of the two-wheeled electric vehicle 1, the electric power flowing in the current terminals 53 and 54 is lowered, such that heating of the connector 5 is significantly reduced or prevented.

At this time, the microcomputer 71 displays information on the display 19 of the two-wheeled electric vehicle 1 so as to inform the rider that the supplied electric power is being lowered. This allows the rider to know that the supplied electric power is being lowered, that is, driving force of the electric motor 2 is decreasing. As a result, the rider is able to take measures such as moderating the operation of the two-wheeled electric vehicle 1, or coming to a stop, etc. The method of informing the rider may be arbitrary; for example, light may be flickered to provide information, or light and sounds may be combined to provide information.

After the process of step S14, the process returns to step S11. If the measurement value of the temperature sensor 60 is less than the second threshold value and yet equal to or greater than the first threshold value, the process of gradually decreasing the electric power supplied to the electric motor 2 is continued. The electric power supplied to the electric motor 2 gradually decreases, so that the two-wheeled electric vehicle 1 decelerates little by little, until finally stopping.

If step S13 determines that the measurement value of the temperature sensor 60 is less than the first threshold value, it is then determined whether or not the measurement value is less than a third threshold value (step S15). The third threshold value is a lower temperature than the first threshold value, e.g., about 75 degrees Celsius. If the measurement value of the temperature sensor 60 is less than the third threshold value, the BMS 33 determines that the temperature of the connector 5 has sufficiently decreased, and cancels the control of gradually decreasing the electric power supplied to the electric motor 2, thus returning to a usual state. At this time, in order to prevent a drastic increase in the electric power supplied to the electric motor 2, the supplied electric power may be gradually increased. After returning to a usual state, the detection process of step S11 is again performed.

If step S15 determines that the measurement value of the temperature sensor 60 is equal to or greater than the third threshold value, control returns to step S11 while continuing the process of gradually decreasing the electric power supplied to the electric motor 2, and the process of gradually decreasing the supplied electric power is continued until the measurement value becomes less than the third threshold value.

If step S13 determines that the measurement value is less than the first threshold value without ever going through the process of step S14, e.g., while the usual state is being maintained, the usual state is maintained intact at steps S15 and step S16, and the detection process of step S11 is again performed.

Figure 7:
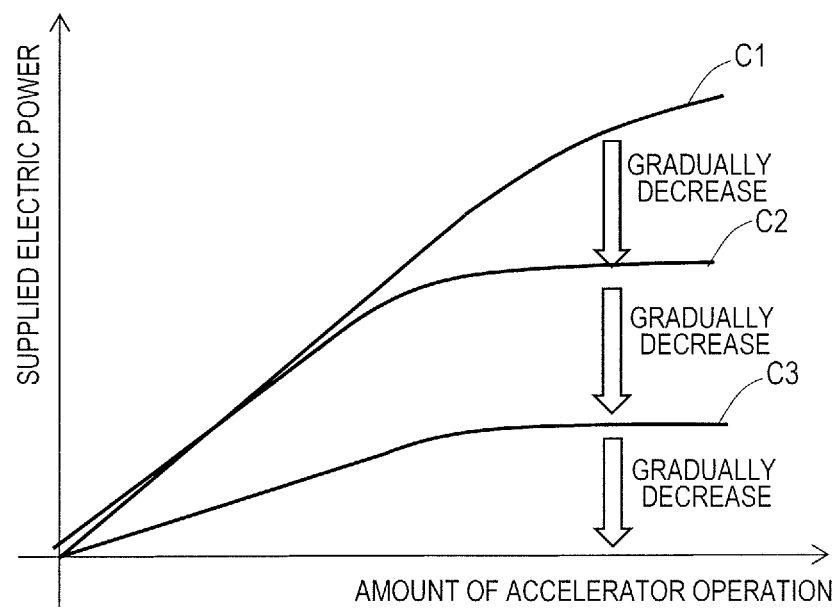
FIG. 7 is a diagram showing a process of gradually decreasing the supply of electric power according to a preferred embodiment of the present invention.

In the present preferred embodiment, when step S13 determines that the measurement value of the temperature sensor 60 is equal to or greater than the first threshold value, the supply of electric power is not immediately stopped, but rather the supplied electric power is gradually decreased. This prevents the two-wheeled electric vehicle 1 from abruptly decelerating. As a method of performing the gradual decrease, the supplied electric power may be continuously lowered in a stepless manner, or may be lowered in discrete steps. FIG. 7 is a diagram showing an exemplary process of gradually decreasing the supplied electric power. The vertical axis represents the supplied electric power, and the horizontal axis represents the amount of accelerator operation by the rider. The accelerator-supplied electric power characteristic curve C1 represents a characteristic curve in the usual state, in which the temperature of the connector 5 is low. When the temperature of the connector 5 has become high so that the supplied electric power is to be lowered, the supplied electric power is gradually decreased. The accelerator-supplied electric power characteristic curve C2 is a characteristic curve when gradual decrease has been carried out to a certain extent, in which the supplied electric power relative to the amount of accelerator operation gradually decreases. The accelerator-supplied electric power characteristic curve C3 is a characteristic curve when a further gradual decrease is performed from the characteristic curve C2.

As the supplied electric power is gradually decreased, the supplied electric power will finally become zero, such that rotation of the electric motor 2 will stop. Thus, while the supplied electric power is being gradually decreased, the rider is able to move the two-wheeled electric vehicle 1 to a proper place in order to bring it to a stop.

After the two-wheeled electric vehicle 1 has stopped, the microcomputer 71 may perform a control of forbidding the two-wheeled electric vehicle 1 to travel until the measurement value of the temperature sensor 60 becomes sufficiently small. Moreover, information may be displayed on the display 19 or the like so as to urge the rider to power OFF the two-wheeled electric vehicle 1. When the two-wheeled electric vehicle 1 is once powered OFF and then powered ON again, a history of temperature measurements that existed before the powering OFF may be reset before the process of step S11 is performed. After it is powered ON again, if the measurement value of the temperature sensor 60 is equal to or greater than the first threshold value albeit less than the second threshold value, a control of forbidding the two-wheeled electric vehicle 1 to travel may be performed.

Figure 8:
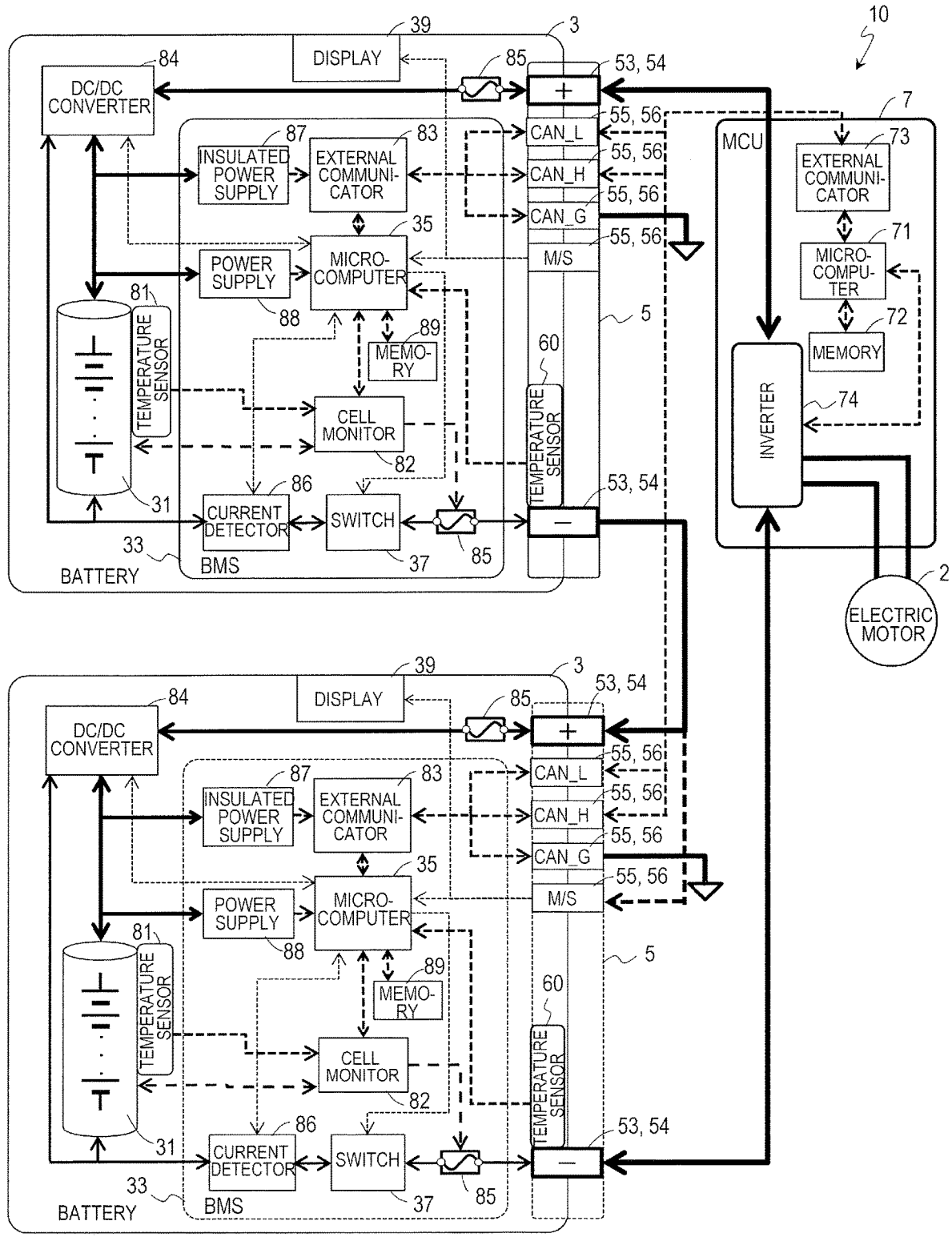
FIG. 8 is a diagram showing a vehicle main body with batteries mounted thereon according to a preferred embodiment of the present invention.

Alternatively, the battery 3 may include a DC/DC converter, such that the DC/DC converter causes a voltage decrease to lower the output power of the battery 3. FIG. 8 is a diagram showing batteries 3 each including a DC/DC converter 84. The DC/DC converter 84 is connected to a battery module 31, and outputs a voltage which is in accordance with the control by the microcomputer 35. For example, at step S13 in FIG. 6, the microcomputer 35 may lower the output power of the battery 3 by lowering the output voltage of the DC/DC converter 84, thus lowering the electric power supplied to the electric motor 2. Thus, by lowering the power consumption of the two-wheeled electric vehicle 1, the electric power flowing in the current terminals 53 and 54 is lowered, such that heating of the connector 5 is significantly reduced or prevented. Note that, during usual control of the two-wheeled electric vehicle 1 and during charging of the battery 3, input/output of electric currents may be performed without passing through the DC/DC converter 84.

Figure 9:
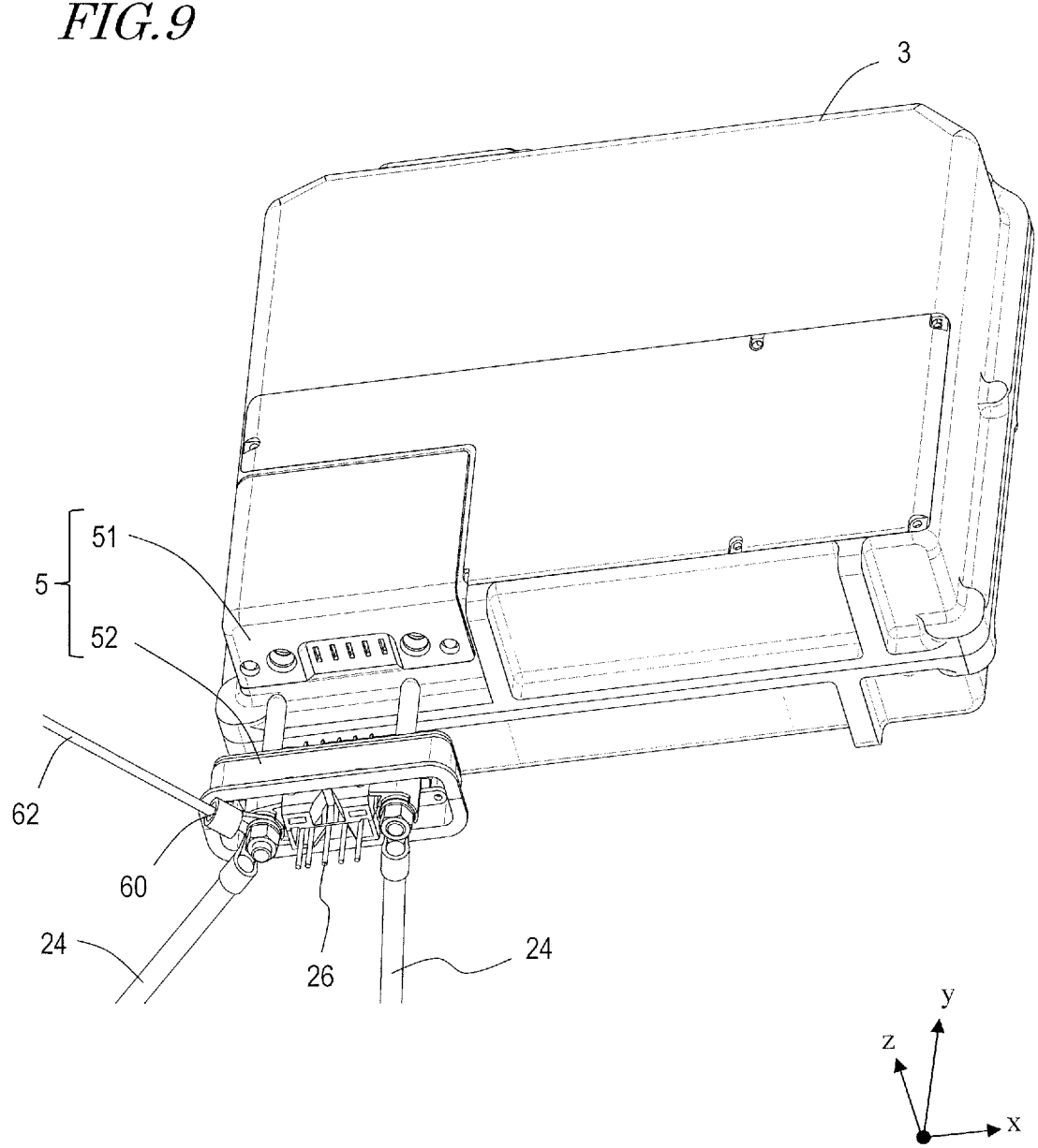
FIG. 9 is a perspective view showing a battery and a connector according to a preferred embodiment of the present invention.
Figure 10:
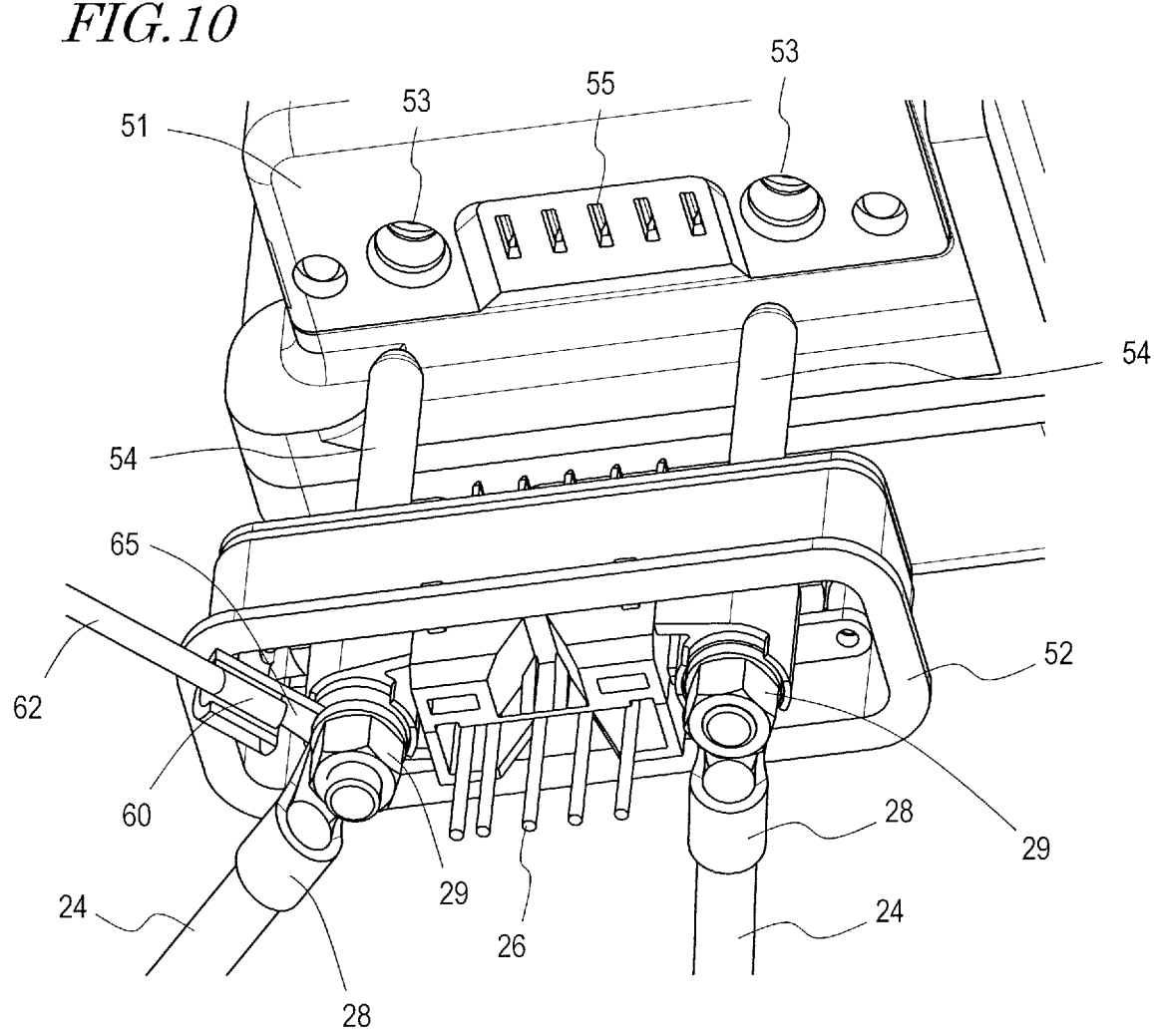
FIG. 10 is a perspective view showing a connector on a battery and a connector on the vehicle main body according to a preferred embodiment of the present invention.

Although the above example illustrates that the temperature sensor 60 is provided on the connector 51 on the battery 3, it may alternatively be provided on the connector 52 on the vehicle main body 10. FIG. 9 is a perspective view showing the battery 3 and the connector 5 in a preferred embodiment in which the temperature sensor 60 is provided on the connector 52. FIG. 10 is a perspective view showing the connector 51 and the connector 52.

In this example, each current terminal 54 is partly threaded, so that a crimp contact 28, which is attached to an electric wire 24, is fixed to the current terminal 54 with a nut 29. The temperature sensor 60 is attached to an insulator 65 which is shaped as a lug terminal, for example. The insulator 65 shaped as a lug terminal is fixed onto the current terminal 54 together with the crimp contact 28, by using the nut 29.

Figure 11:
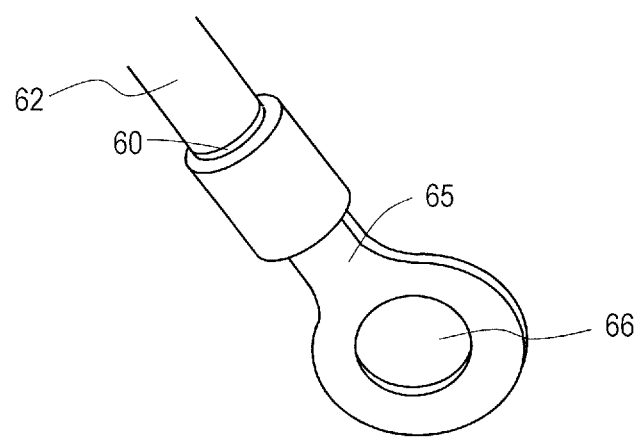
FIG. 11 is a perspective view showing an insulator including a temperature sensor attached thereto according to a preferred embodiment of the present invention.
Figure 11:
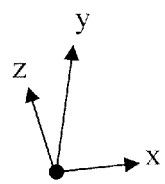

FIG. 11 is a perspective view showing the insulator 65 including the temperature sensor 60 attached thereto. By passing the current terminal 54 through a hole 66 of the insulator 65 and fixing it with the nut, the insulator 65 becomes fixed to the current terminal 54. The insulator 65 may be formed by coating a metal material with a resin, for example. Inclusion of a metal in the interior of the insulator 65 improves thermal conductivity, such that the temperature difference between the current terminal 54 and the temperature sensor 60 is reduced. Moreover, inclusion of a metal in the interior of the insulator 65 allows the strength of the insulator 65 to be enhanced. Electrical insulation is achieved by the resin with which the surface of the insulator 65 is coated. The temperature sensor 60 belongs in the low-voltage circuitry, whereas the current terminals 54 belong in the high-voltage circuitry. In this example, indirectly measuring the temperature of the current terminals 54 via the insulator 65 ensures separation of the electric circuitry between the high-voltage circuitry and the low-voltage circuitry, thus realizing a structure which does not need an isolation circuit.

The temperature sensor 60 is connected to the MCU 7 via the signal line 62 so that the MCU 7 is able to detect temperature by using the temperature sensor 60. Similarly to the operation of the microcomputer 35 of the BMS 33 as has been described with reference to FIG. 6, the microcomputer 71 of the MCU 7 monitors the measurement value of the temperature sensor 60, and performs a control of lowering the electric power supplied to the electric motor 2 in accordance with the measurement value. For example, the microcomputer 71 may lower the electric power which is output from the inverter 74 so as to lower the electric power supplied to the electric motor 2, thus lowering the torque of the electric motor 2. Thus, by lowering the power consumption of the two-wheeled electric vehicle 1, the electric power flowing in the current terminals 53 and 54 is lowered such that heating of the connector 5 is significantly reduced or prevented.

Lowering of the supplied electric power is achieved by gradually decreasing the supplied electric power, as has been described above. That is, torque of the electric motor 2 is gradually decreased. As has been described with reference to FIG. 6 and FIG. 7, the supplied electric power is gradually decreased, until finally the supplied electric power becomes zero, such that rotation of the electric motor 2 will stop. Thus, while the supplied electric power is being gradually decreased, the rider is able to move the two-wheeled electric vehicle 1 to a proper place in order to bring it to a stop.

Figure 12:
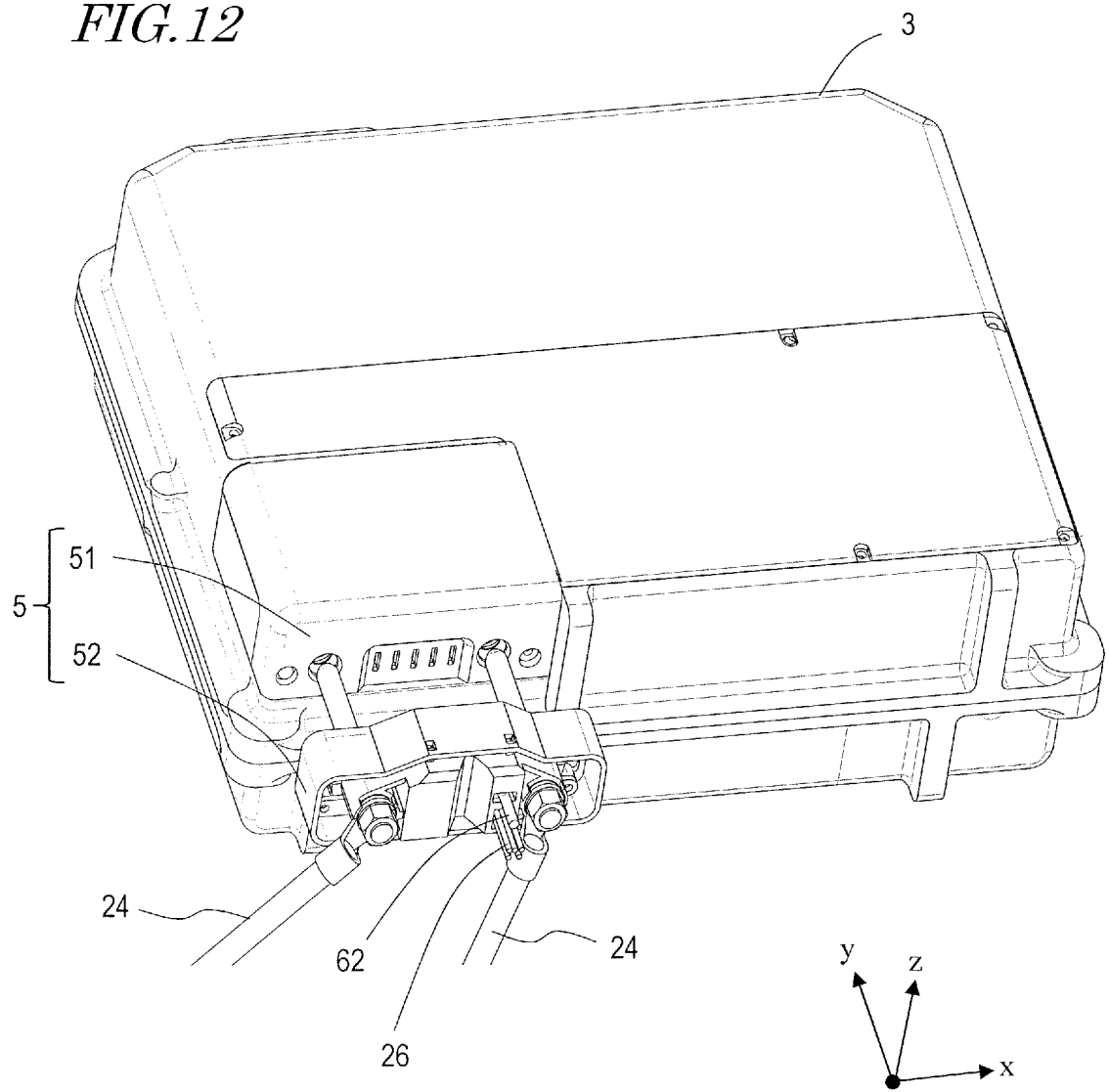
FIG. 12 is a perspective view showing a battery and a connector according to a preferred embodiment of the present invention.
Figure 13:
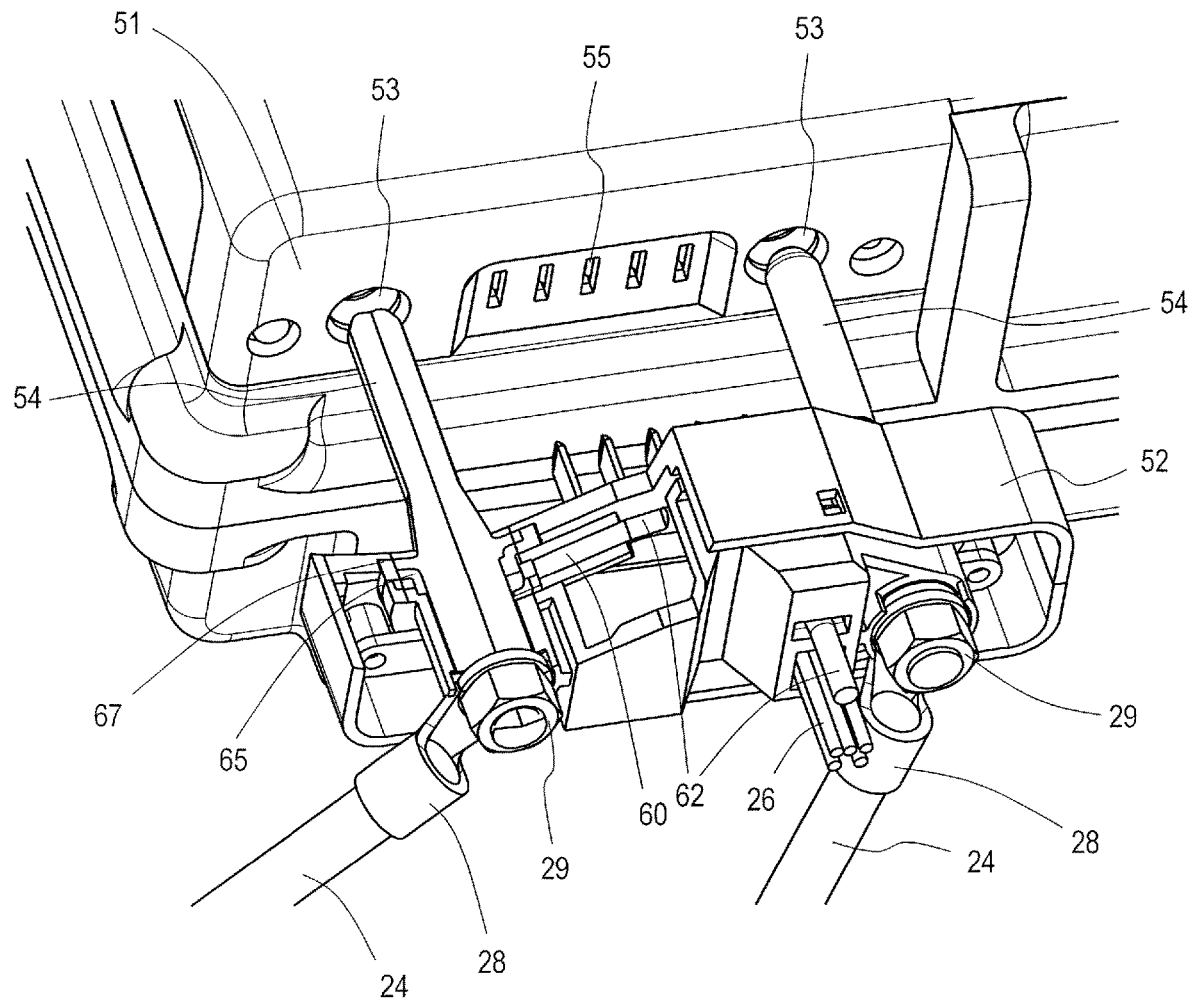
FIG. 13 is a perspective view showing a connector on a battery and a connector on the vehicle main body according to a preferred embodiment of the present invention.
Figure 14:
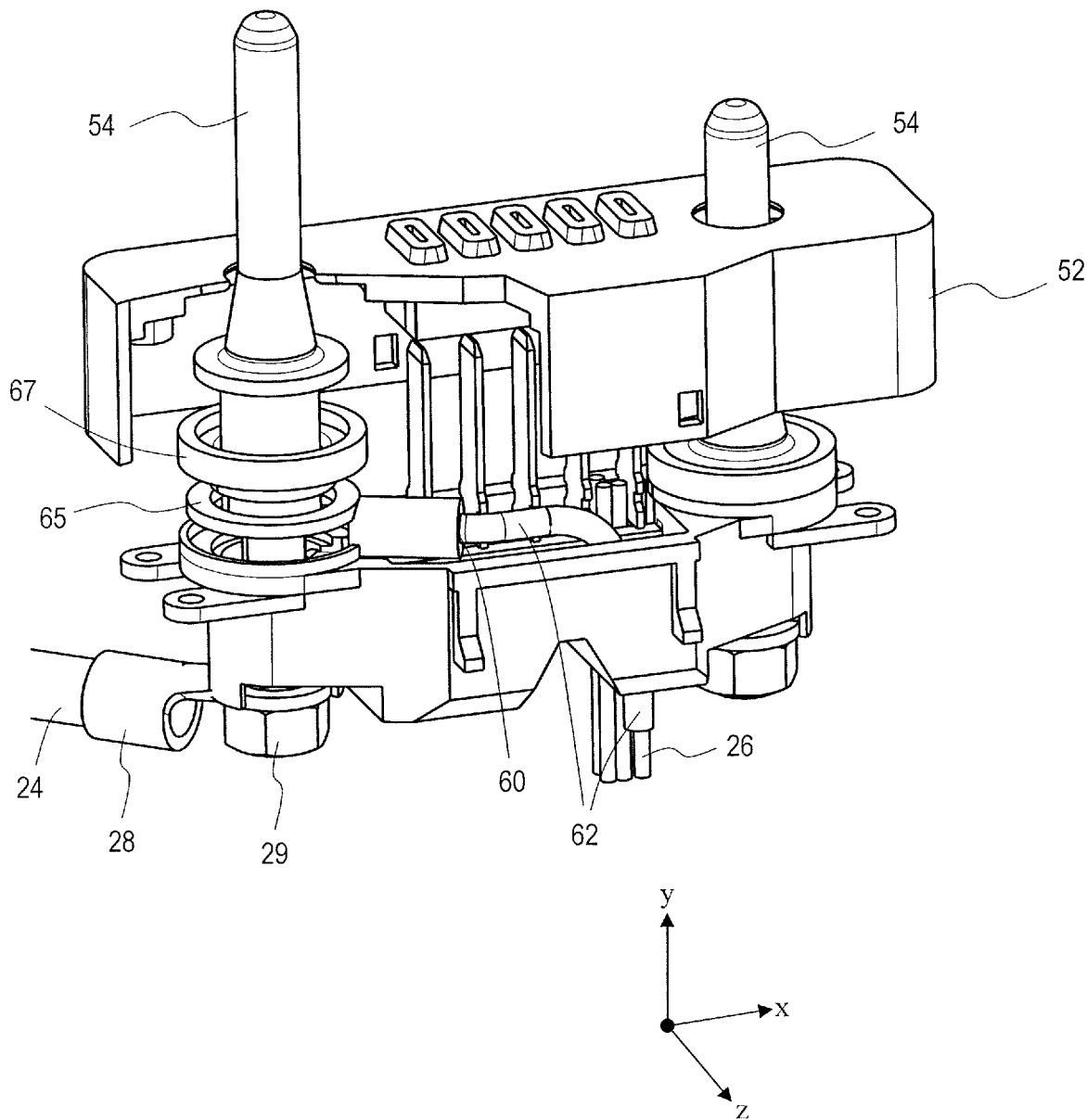
FIG. 14 is an exploded perspective view showing a connector on the vehicle main body according to a preferred embodiment of the present invention.

FIG. 12 is a perspective view showing another implementation of a connector 5 in which the temperature sensor 60 is provided on the connector 52. FIG. 13 is a perspective view showing the connector 51 and the connector 52. FIG. 14 is an exploded perspective view of the connector 52. For ease of explanation, a portion of the connector 52 is cut away for illustration in FIG. 13 and FIG. 14.

In this example, the temperature sensor 60 is provided in the interior of the connector 52. In the interior of the connector 52, while a current terminal 54 extends through a hole in an insulator 65, the insulator 65 is fitted in the insulator 67. The insulator 67 fixes the position of the insulator 65 including the temperature sensor 60 attached thereto. The temperature sensor 60 is connected to the MCU 7 via a signal line 62, so that the MCU 7 is able to detect temperature by using the temperature sensor 60. By performing a similar control to the above, heating of the connector 5 is significantly reduced or prevented.

Moreover, when the detected temperature becomes equal to or greater than the first threshold value, the BMS 33 and/or MCU 7 may store a piece of temperature information indicating the same. The temperature information may be stored in the memory 72 and/or 89, for example. By storing temperature information as a history of conditions of the two-wheeled electric vehicle 1, it becomes possible to utilize the temperature information to control the two-wheeled electric vehicle 1, or for maintenance work.

Moreover, when restarting the two-wheeled electric vehicle 1, the microcomputer 35 and/or 71 may control power consumption of the two-wheeled electric vehicle 1 based on stored temperature information. For example, once the number of times that the detected temperature has become equal to or greater than the first threshold value reaches a predetermined number of times, a control of reducing power consumption of the two-wheeled electric vehicle 1 may be performed even when the detected temperature is less than the first threshold value.

Moreover, in a preferred embodiment where the temperature sensor 60 is provided on the connector 51 on the battery 3, the temperature sensor 60 may detect the temperature of the connector 51 during charging of the battery 3. Since the temperature sensor 60 is provided on the battery 3, the temperature sensor 60 is able to detect the temperature of the connector 51 even while the battery 3 is detached from the vehicle main body 10. When the detected temperature is equal to or greater than a predetermined value during charging of the battery 3, the BMS 33 may perform a control of lowering the charging current as compared to when it is less than the predetermined value. By controlling the charging current in accordance with the temperature of the connector 51 during charging of the battery 3, heating of the connector 51 during charging is significantly reduced or prevented.

Although the above example illustrates that the number of temperature sensors 60 to be provided on the connector is one, a plurality of temperature sensors 60 may be provided. For example, temperature sensors 60 may be provided near the positive terminal and near the negative terminal, respectively. Moreover, temperature sensors 60 may be provided on both of the connectors 51 and 52.

Although the above example illustrates the electric motor 2 as an AC motor, it may be a DC motor. When the electric motor 2 is a DC motor, a controller that controls the voltage and current of the DC motor may be provided instead of an inverter 74.

The above example illustrates that a drive wheel to which the driving force of the electric motor 2 is transmitted is the rear wheel 13; however, depending on the implementation of the wheeled electric vehicle, the driving force of the electric motor 2 may be transmitted to the front wheel 12. Moreover, the driving force may be transmitted to both of the front wheel 12 and the rear wheel 13.

The above example illustrates that the vehicle on which the battery(s) is mounted is a wheeled vehicle. However, examples of preferred embodiments of the present invention are not limited to a wheeled vehicle; a preferred embodiment of the present invention may be a marine vessel or an aircraft that is driven by an electric motor, for example. Moreover, preferred embodiments of the present invention are also applicable to a hybrid system in which an electric motor and an internal combustion engine are used in combination. Moreover, a vehicle according to a preferred embodiment of the present invention is not limited to a transport machine for a human to ride, but may also be a transport machine that undergoes unmanned operation. Moreover, preferred embodiments of the present invention are also applicable to machines such as robots. The preferred embodiments of the present invention are applicable to machines that operate by using a detachable battery.

Thus, preferred embodiments of the present invention have been described. The foregoing description of preferred embodiments is a mere illustration of the present invention, and should not be interpreted as limiting the present invention. Preferred embodiments can also emerge from certain combinations of the component elements described in the above preferred embodiments. Various changes, substitutions, additions, omissions, etc., can be made to the present invention without departing from the scope defined by the claims and the equivalents thereof.

Preferred embodiments of the present invention are particularly useful in the field of vehicles in which a driving force is generated by using electric power that is supplied from a detachable battery.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle comprising:
   an electric motor that generates a driving force to move the vehicle;
   a battery that is detachable from a body of the vehicle;
   a connector that electrically connects the battery with electric circuitry of the body;
   a temperature sensor that detects a temperature of the connector to provide a detected temperature; and
   a controller configured or programmed to, when the detected temperature of the connector is equal to or greater than a first threshold value, lower power consumption of the vehicle during movement as compared to when the detected temperature of the connector is less than the first threshold value; wherein
   in accordance with an electric power supplied from the battery via the connector, the electric motor generates a driving force to cause the vehicle to move;

when the controller lowers the power consumption of the vehicle during movement, the controller is configured or programmed to determine whether or not the detected temperature is less than another threshold value which is a lower temperature than the first threshold value;
the controller is configured or programmed to continue lowering the power consumption of the vehicle during movement when the detected temperature is equal to or greater than the another threshold value; and
the controller is configured or programmed to cancel lowering the power consumption of the vehicle during movement when the detected temperature is less than the another threshold value.

2. The vehicle of claim 1, wherein
the connector includes a current terminal through which an electric current that is output from the battery flows;
an insulator is disposed between the current terminal and the temperature sensor; and
the temperature sensor detects a temperature of the current terminal via the insulator.

3. The vehicle of claim 2, wherein
the insulator insulates high-voltage circuitry from low-voltage circuitry in one of the battery and the body;
the current terminal is disposed in the high-voltage circuitry; and
the temperature sensor is disposed in the low-voltage circuitry.

4. The vehicle of claim 1, wherein
the connector includes a battery connector on the battery side and a body connector on the body; and
the temperature sensor is disposed on the battery connector.

5. The vehicle of claim 1, wherein the controller includes a battery management system in the battery, and is configured or programmed to lower the power consumption of the vehicle during movement by reducing an output of the battery.

6. The vehicle of claim 1, wherein
the temperature sensor detects a temperature of the connector during charging of the battery; and
during charging of the battery, the controller is configured or programmed to, when the detected temperature is equal to or greater than a predetermined value, lower a charging current as compared to when the detected temperature is less than the predetermined value.

7. The vehicle of claim 1, wherein
the connector includes a battery connector on the battery and a body connector on the body; and
the temperature sensor is disposed on the body connector.

8. The vehicle of claim 1, wherein the controller is configured or programmed to lower the power consumption of the vehicle during movement by reducing at least one of:
an output of the battery; and
a torque of the electric motor.

9. The vehicle of claim 8, wherein the controller is configured or programmed to, when lowering the power consumption of the vehicle during movement, decrease at least one of:
the output of the battery; and
the torque of the electric motor.

10. The vehicle of claim 9, wherein the controller is configured or programmed to, after decreasing at least one of the output of the battery and the torque of the electric motor, set a number of revolutions of the electric motor to zero.

11. The vehicle of claim 1, further comprising a notifier that informs a rider of the vehicle that the power consumption of the vehicle during movement is being lowered.

12. The vehicle of claim 1, wherein, when the detected temperature is equal to or greater than a second threshold value which is higher than the first threshold value, the controller is configured or programmed to stop supplying the electric power from the battery to the electric motor.

13. The vehicle of claim 1, wherein the controller is configured or programmed to store temperature information indicating that the detected temperature has become equal to or greater than the first threshold value.

14. The vehicle of claim 13, wherein, when restarting the vehicle, the controller is configured or programmed to control the power consumption of the vehicle based on the stored temperature information.

15. The vehicle of claim 1, wherein
the vehicle is a wheeled electric vehicle; and
during travel of the wheeled electric vehicle, the controller is configured or programmed to, when the detected temperature is equal to or greater than the first threshold value, lower the power consumption of the wheeled electric vehicle as compared to when the detected temperature is less than the first threshold value.

16. The vehicle of claim 1, wherein
the controller is configured or programmed to store temperature information indicating that the detected temperature has become equal to or greater than the first threshold value; and
the controller is configured or programmed to, once the number of times that the detected temperature has become equal to or greater than the first threshold value reaches a predetermined number of times, lower power consumption of the vehicle during movement regardless of a value of the detected temperature.

17. A vehicle comprising:
an electric motor that generates a driving force to move the vehicle;
a battery that is detachable from a body of the vehicle;
a connector that electrically connects the battery with electric circuitry of the body;
a temperature sensor that detects a temperature of the connector to provide a detected temperature; and
a controller configured or programmed to, when the detected temperature of the connector is equal to or greater than a first threshold value, lower power consumption of the vehicle during movement as compared to when the detected temperature of the connector is less than the first threshold value; wherein
in accordance with an electric power supplied from the battery via the connector, the electric motor generates a driving force to cause the vehicle to move;
the controller is configured or programmed to store temperature information indicating that the detected temperature has become equal to or greater than the first threshold value; and
the controller is configured or programmed to, once the number of times that the detected temperature has become equal to or greater than the first threshold value reaches a predetermined number of times, lower the power consumption of the vehicle during movement regardless of a value of the detected temperature.

* * * * *